United States Patent [19]

Stromberg et al.

[11] Patent Number: 4,706,451
[45] Date of Patent: Nov. 17, 1987

[54] CHAIN LOCK FOR ROUND LINK CHAIN STRANDS PARTICULARLY FOR USE IN MINING

[75] Inventors: Wilfried Stromberg, Olfen; Theo Kuhnigk, Datteln, both of Fed. Rep. of Germany

[73] Assignee: Becker-Pronte GmbH, Fed. Rep. of Germany

[21] Appl. No.: 839,065

[22] Filed: Mar. 13, 1986

[51] Int. Cl.[4] .............................................. F16G 15/04
[52] U.S. Cl. .......................................... 59/85; 59/78; 59/86
[58] Field of Search ................... 59/85, 86, 87, 78, 84; 474/218, 219; 63/4; 24/116 R

[56] References Cited

U.S. PATENT DOCUMENTS

| | | | |
|---|---|---|---|
| 2,369,344 | 2/1945 | Ehmann | 59/86 |
| 2,525,194 | 10/1950 | Anderson et al. | 59/86 |
| 4,107,917 | 8/1978 | Fink | 59/86 |
| 4,505,103 | 3/1985 | Dalferth et al. | 59/85 |
| 4,590,758 | 5/1986 | Hanning et al. | 59/85 |

Primary Examiner—Robert L. Spruill
Assistant Examiner—David B. Jones
Attorney, Agent, or Firm—Remy J. VanOphem

[57] ABSTRACT

A chain lock for round chain links, particularly for use in mining, consisting of preferably congruent part links, a center portion and a locking pin. The center portion is supported on cylindrical surfaces which form the base of a recess. The recess is provided in either inner side of the inner shank of the part links and undercuts both outer sides of the shank attached to it. The center piece has cylindrical supporting surfaces on opposite sides, and a pair of flat surfaces which are pierced by the cylindrical-surfaced supports. The ends of the center piece are supported in the receiver of the shanks when the center piece is inserted. The pin pierces the center piece at an angle and protrudes with its ends above and below the surfaces of the center piece to prohibit it from being rotated.

4 Claims, 3 Drawing Figures

CHAIN LOCK FOR ROUND LINK CHAIN STRANDS PARTICULARLY FOR USE IN MINING

BACKGROUND OF THE INVENTION

1. Field of the Invention

This invention relates to a chain lock for round-link chain strands, particularly for use in mining.

2. Description of the Prior Art

Round-link chains are used in mining, because of their great strength, chiefly for conveying motive energy to extraction machines and conveyors. For example, they can drive a coal planer, whereby the chain winds around one or several drive chain drums. Furthermore, round-link chains can be used in various arrangements as outer or middle chains in chain belts on scraper conveyors, used for transmitting motive energy to scrapers, which move the goods to be transported forward in a scraping manner to the base of the conveyor chute. Such round-link chains are subdivided into chain strands, on account of their considerable length and for transport reasons, these chain strands being locked together by means of chain locks. Chain locks are also used for locking the ends of a chain strand to a rotary chain drive, and for repairing chain cracks which are caused by the breaking of a chain link or of a chain lock.

With the exception of chain locks used solely as so-called repair links for mining chains of the type described, these chain locks can be engaged and disengaged in a vertical or horizontal position, or in both positions, into the corresponding recesses of the chain drive drums, which with continually rotating chain drives is always the case. With chain drives which move to and fro, however, such as are used in extraction machines, for example, that only has to be the case on the length of chain drive being driven. The dimensions of the chain locks according to the invention are therefore usually predetermined by the slit-shaped and/or pouch-shaped recesses of the drive chain drums and by the chain pitch. On the other hand, these chain locks are subjected to the full load of the propelling force of the chain, which force must be carried away, owing to the required distribution of the chain lock on the two supplementary part links, with surfaces which are formed on the part links. The dimensions of these surfaces, which are necessarily limited by the burden described, lead to high surface loading and thereby to permanent distortion of the chain locks.

The inserted center piece holds the part links together, and for that purpose must be brought into a predetermined position of the chain links which are linked together. The inserted center piece is blocked by the pin, so that during operation it cannot be thrown out of contact with the part links by the forces brought to bear on it. For various reasons it can, however, be necessary to release from each other end links of one or several chain strands connected to a chain lock, by removing the chain lock. The chain lock presents itself for this application, since after removal of the pin and of the center piece it can be disassembled into its part links. In all cases, this is easier than undoing a link in the round link chain which is closed upon itself. However, should the chain lock be disassembled into its part links after prolonged loading by use of the round-link chain, then disassembly must be possible despite a permanent distortion of the chain lock which may occur. That is fundamentally impossible if the inserted center piece is self-locking and is formed as a lock. This occurs, for example, with center pieces consisting of a recessed screw, the bore holes of which are formed half in the shanks of the part links.

This invention proceeds from a previously known chain lock, the center piece of which forms a pin, on which only the separating and supporting surfaces which carry away the disconnecting forces are formed. These disconnecting forces emanate from the part links. Since, by this means, the locks of the center piece are formed by the pin which is separable from it, this pin can be arranged in such a way that it is not burdened with the disconnecting forces, but it fulfills its blocking function. In the previously known chain lock, this depends on the fact that the pin, which in the form of a clamping sleeve is self-locking on friction contact, pierces the center piece and the part links, into the ends of which it sinks. Therefore, the pin is withdrawn from the mechanical stresses acting on the chain lock from the outside, and is also relieved from the disconnecting forces, since these are only effective on the supporting surfaces of the part links of the lock and of the center piece.

The permanent distortions of the chain lock have a disadvantageous effect on the pins, since they load these pins for a shearing action on the separating surfaces of the chain lock, which is conditional owing to the fit of the pin in the distorted bore holes which penetrate the parts of the chain lock. The stress of the pin on shearing does not, as a rule, lead to the breaking of the pin, as long as the parts of the chain lock do not break. However, they distort the pin with the chain lock. When the chain lock is relieved, the pin can then only be expelled from the chain lock either with great difficulty or not at all, since its pressure locking or form locking has become too great. The overcoming of these forces in the chain lock presupposes an instrument which is effective in spite of the ends of the pin being sunk in the parts of the chain lock. Plugs which can be considered, however, are not only difficult to operate, but also for their part lead to distortions of the pin when being driven out, which makes this procedure more difficult, frequently completely defeating it.

SUMMARY OF THE INVENTION

This invention is based on the task of producing a chain lock of the type described, which when its parts are considerably distorted also facilitates the removal of the pin from the center piece, and after longer operation times can be broken up again into its parts even under unfavorable mining conditions.

This problem is solved according to the invention by a center piece rotatably received in cylindrical recesses formed on the inner surfaces of the part links and an angularly disposed pin received through the center piece to prohibit its rotation.

According to the invention, the cylindrical recesses whose radii in the plane of the chain lock lie on the axle, center of the chain lock reproducing the pulling direction when the chain strands are stretched, lead to the avertence of the center piece on distortion of the chain lock resulting from tensile loads due to stress with the chain strands, whereas any other directions of movement can only distort the center piece. The pin locks the inserted center piece against avertence in the chain lock with its free ends, which are supported on a shank, so that only the length in the center piece existing between the free ends of the pin is disconnected. Therefore, only the free ends of the pin are distorted. These can be easily removed, for example, sawn off. Then the parts of the chain lock become free at once and the chain lock can be opened. Since, however, the free ends of the pin lie adjacent to the shank on the inside and do not protrude outwards, they avoid the mechanical stresses acting from the outside, so that these cannot adversely affect the cohension of the chain lock.

This invention has the advantage that it makes it possible to retain the simplicity of a chain lock closure consisting of a pin or a clamping sleeve embodying this, and that it avoids its disadvantages, since the operations necessary for unlocking it can be carried out with simple and effective tools, and under difficult mining conditions.

The smaller the dimensions of the center piece at right angles to the main stress described, that is, resulting in the pulling direction of the chain lock, the more material is available in the shanks of the part links for conveying the disconnecting forces of the chain lock in the direction of main stress. That generally leads to the center piece itself receiving the smallest possible expansion in the cross direction. The center piece is made in the form of a slotted bolt having a pair of opposing flat surfaces. The slotted bolt can be rotated by means of a tool, particularly a screw driver, so as to insert or release the bolt sections.

In the preferred embodiment, the separating and locking surfaces of the hooks are formed at an angle to the direction of stress. As a result the disconnecting forces on the carrying surfaces, arising from the propelling forces, are decreased, and by this means the carrying surfaces of the center piece and their opposite surfaces in the chain lock are released, as well as the ends of the pin.

Details, further features and other advantages of the invention are to be found in the following description of an embodiment of the new chain lock, with reference to the figures of drawings.

DETAILED DESCRIPTION OF THE PREFERRED EMBODIMENT

Figure 1:
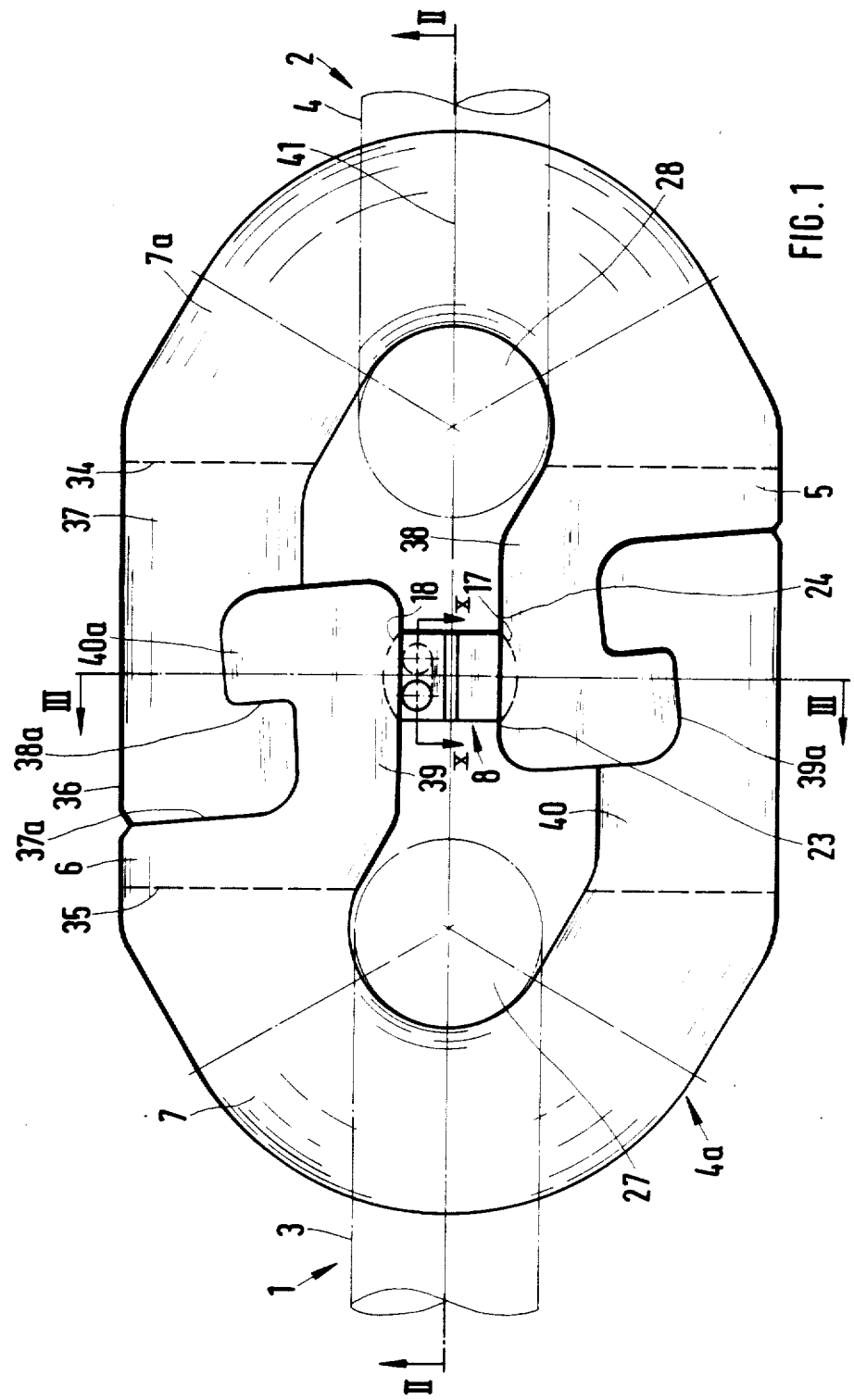
FIG. 1 shows a top view of a chain lock according to the invention.

The chain drive reproduced in the figures of drawings, with the chain strands 1, 2 consecutive to the end links 3, 4, consists of round-link chains. The two end links 3, 4 are joined together by means of a chain lock. The chain lock consists of the two part links 5 and 6. The two part links 5, 6 are congruent. Each part link has one of the curve portions 7 or 7a of the chain lock 4a, and a section 37, 38 or 39, 40 of the shank of the chain lock, these shanks connected to the curve portions. Both shanks 37, 38 and 39, 40 can be passed through the end links 3 or 4, and thereby can be brought into the starting position, in which they are assembled. By this means, the part links 5, 6 are brought into the position which can be seen in FIG. 1, but still one above the other. They can then be moved opposite to each other at right angles to the drawing plane, and can thereby be engaged with each other. As soon as they occupy the position shown in FIG. 1, a center piece 8 is inserted, which supports the shanks 38, 49 lying on the inside. The center piece is locked in position by driving a pin 9, implemented by a clamping sleeve, into a bore hole 9a arranged at an angle to the upper and lower surfaces of the center piece.

Figure 3:
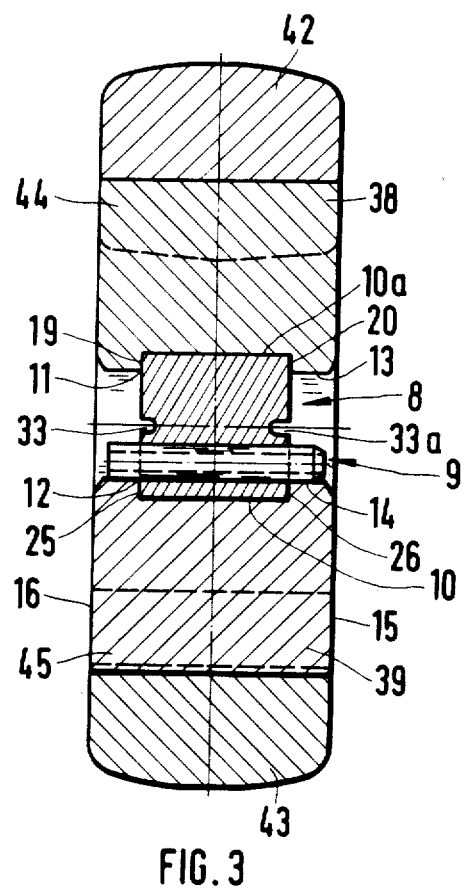
FIG. 3 shows the subject-matter of FIGS. 1 and 2 as a section along the line III—III of FIG. 1.

The inserted center piece 8 is supported on a cylindrical surface 10 and 10a. Each of these cylindrical surfaces forms the base of a recess 11, 12, which is arranged on the inner side 13, 14 of the inner shank 38, 39 of the part links 5, 6 connected together. The center piece has cylindrical support surfaces 17, 18 on opposite sides. Moreover, a pair of flat surfaces are provided on the center piece, which are supported at 19 and 20 in the recess 11 on the inner side 13 of the shank 38. The recesses 11 and 12 are penetrated by the cylindrical support surfaces 17, 18. The ends of each of each recess 11 and 12 are given the reference numerals 23 and 24. The supporting of the shank recesses 11, 12 takes place at 19, 20 on the flat walls 25, 26, of the recess 12 as is shown in FIG. 3.

On insertion of the center piece 8, the part linsk 5 and 6 are positioned in such a way that the curve portions 7, 7a of the captivate the curves 27, 28 of the end links 3, 4 of the extended chain strands 1, 2.

The pin 9, which is driven through the angled bore hole 9a of the center piece 8, protrudes with both its free ends 29, 30 pointing outwards above the surfaces 21, 22. The illustration in FIG. 1 shows that penetration takes place below the ends 23, 24 of the intersection lines of the cylindrical surfaces 17 and 18. Therefore, the two ends 29,30 near the recess 12 are supported on the inner side 14 of the shank 39.

Figure 2:
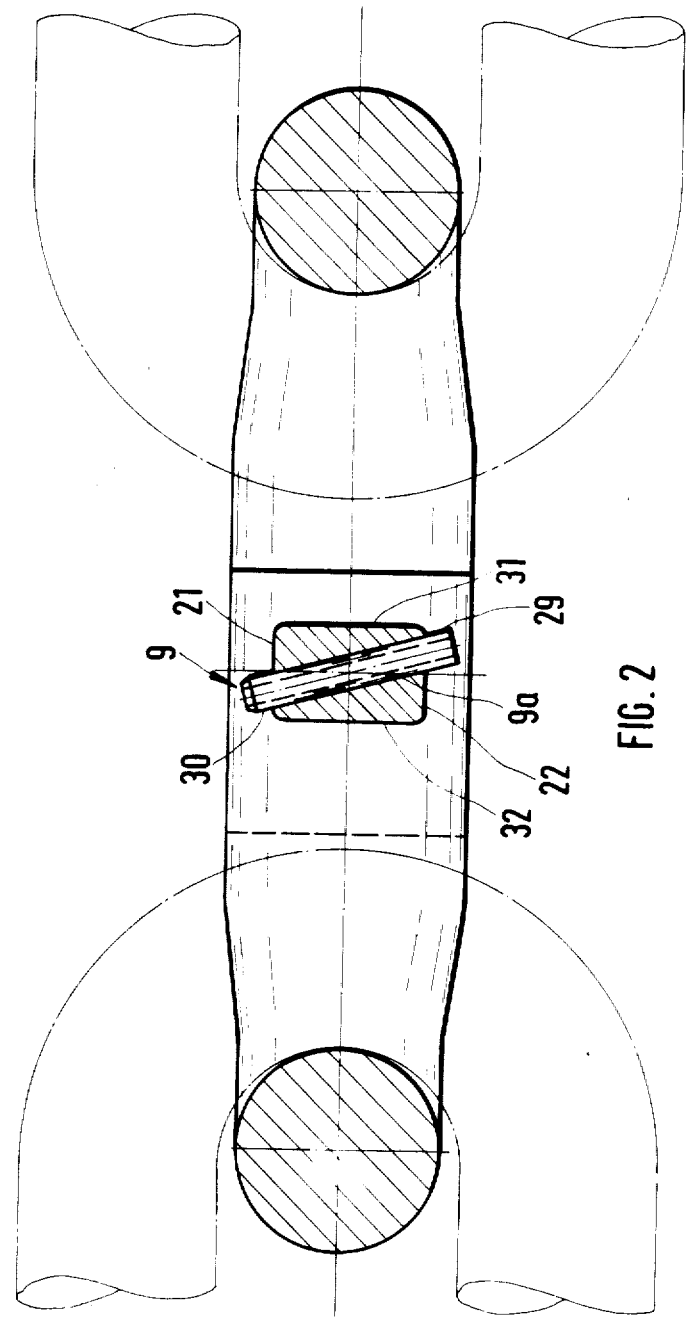
FIG. 2 shows a side view of the subject-matter of FIG. 1 as a section along the line II—II of FIG. 1.

It can be seen from the illustration in FIG. 2 that the surfaces 21, 22, together with the pair of surfaces 31, 32, produce an approximately rectangular cross-section of the center piece. Slots 33, 33a are cut out from the center piece on surfaces 21, 22, these slots enabling a screw driver to be inserted, in order to rotate the center piece as a slot bolt on its cylindrical surfaces.

The shanks 37 to 40 of the part links 5, 6 have flattened cross-sections, which go over onto the dotted lines 34, 35 in the round cross-section of the curves 7, 7a. All the shanks 37 to 40 form hooks. The backs of the hooks are all given the same reference number 36, on account of the uniformity of covering of the hooks. The mouth of the hook consists of the surface 37a, which presents a separating surface, and a surface 38a which is supported on its opposite surface, and thereby transmits the propelling forces acting in the main direction. This surface reaches the front surface 39a of the top of the hook 40a.

It runs at right angles to the backs 36 of the hooks and at an acute angle to the pulling direction of the extended chain strands 1, 2, which is shown by the dotted line and given the reference numeral 41.

The hooks 42, 43 arranged on the outside are in alignment with the shank projections 37 to 40 of the other part links 5, 6. The hooks 44, 45 arranged on the inside, on the other hand, protrude inwards with the root of the top of the hook 40a above the inner side of the shank projections assigned to it (FIG. 1).

When the chain lock 4a, as previously stated, is brought together by its part links 5, 6 being connected together, and the center piece 8 has been inserted, the pin 9 can be driven in and locks the center piece so that it cannot be untwisted. Should the chain lock be distorted, then this generally occurs in the main pulling direction 41. By this means, the center piece is rotated and, therefore, strains the pin 9 to shearing. Both its ends 30, 29 can, therefore, be distorted. If the chain lock 4 is to be released again, then the ends 30, 29 of the pin can be sawn off or cut off with a chisel along the surfaces 21, 22. Then the center piece 8 can be removed by untwisting. If necessary, the tool slots 33a, 33 can be used for this.

As can be seen in FIG. 2, the ends 29, 30 of the pin 9 with a mounted chain lock 4a do not protrude above its outer dimensions, that is, the surfaces 15, 16, and, therefore, cannot be mechanically stressed.

What is claimed is:

1. A chain lock for joining round link chains, comprising:

a pair of interconnectable congruent part links, each part link having an outer shank and a generally parallel inner shank connected by a curved portion, said outer shank having an inwardly facing hook provided at the end thereof and said inner shank having an outwardly facing hook provided at its end such that when said pair of part links are interconnected, said inwardly facing hook and outwardly facing hook of one of said pair of part links respectively engage the outwardly facing hook and the inwardly facing hooks of the other of said pair of part links, each of said inner shanks further having an inner face opposite said outwardly facing hook and a cylindrically shaped recess provided in said inner face;

a center piece rotatably received in said cylindrically shaped recesses of said one and said other of said pair of part links when said inwardly and outwardly facing hooks are engaged, said center piece having flat side surfaces and arcuate end surfaces on the ends thereof which are rotatably received in said cylindrically shaped recesses to lock said pair of part links to each other, and a pin bore angularly provided therethrough adjacent to the inner face of one of said inner shanks; and a pin driven in said pin bore having its opposite ends protruding externally from the surfaces of said center piece and engaging said inner face of said inner shank to prevent the rotation of said center piece.

2. The chain lock of claim 1 wherein said center piece is a slotted bolt having a pair of flat side surfaces.

3. The chain lock of claim 1 wherein said inner and outer shanks of each part link have flattened cross-sections and said hooks are formed in the region of said flattened cross-sections.

4. The chain lock of claim 1 wherein said hooks have a release surface and a carrying surface formed at an acute angle to said inner and outer shanks.

* * * * *

UNITED STATES PATENT AND TRADEMARK OFFICE
CERTIFICATE OF CORRECTION

Page 1 of 2

PATENT NO. : 4,706,451
DATED : November 17, 1987
INVENTOR(S) : Stromberg et al

It is certified that error appears in the above-identified patent and that said Letters Patent is hereby corrected as shown below:

On title page at area [73], please delete "Becker-Pronte GmbH" and insert ---- Becker-Prunte GmbH ----.

UNITED STATES PATENT AND TRADEMARK OFFICE
CERTIFICATE OF CORRECTION

PATENT NO. : 4,706,451

DATED : November 17, 1987

INVENTOR(S) : Stromberg et al

It is certified that error appears in the above-identified patent and that said Letters Patent is hereby corrected as shown below:

Column 3, line 8, delete "cohension" and insert ---- cohesion ----.

Column 3, line 57, after "shanks" insert ---- being ----.

Column 4, line 1, delete "49" and insert ---- 39 ----.

Column 4, line 16, delete "of each" (second occurrence).

Column 4, line 21, delete "linsk" and insert ---- links ----.

Column 4, line 23, delete "of the" (first occurrence).

Column 4, line 61, delete "projections" and insert ---- projection ----.

Column 5, line 25, delete "hooks" and insert ---- hook ----.

Signed and Sealed this

Twenty-first Day of June, 1988

Attest:

DONALD J. QUIGG

Attesting Officer

Commissioner of Patents and Trademarks